(12) United States Patent
Wakchaure

(10) Patent No.: US 7,869,167 B2
(45) Date of Patent: Jan. 11, 2011

(54) METHOD AND DEVICE FOR PREVENTION AND PROTECTION OF ELECTRICAL TRANSFORMER AGAINST EXPLOSION AND FIRE

(75) Inventor: Kisanrao Vijaykumar Wakchaure, Maharashtra (IN)

(73) Assignee: CTR Manufacturing Industries Limited, Poona (IN)

( * ) Notice: Subject to any disclaimer, the term of this patent is extended or adjusted under 35 U.S.C. 154(b) by 461 days.

(21) Appl. No.: 11/913,410

(22) PCT Filed: Apr. 13, 2006

(86) PCT No.: PCT/IN2006/000128

§ 371 (c)(1),
(2), (4) Date: Nov. 1, 2007

(87) PCT Pub. No.: WO2007/057916

PCT Pub. Date: May 24, 2007

(65) Prior Publication Data

US 2008/0186641 A1    Aug. 7, 2008

(30) Foreign Application Priority Data

Nov. 16, 2005    (IN)    .................... 1425/MUM/2005

(51) Int. Cl.
*H02H 7/04* (2006.01)
*H02H 5/04* (2006.01)

(52) U.S. Cl. .......................................... 361/36; 361/37
(58) Field of Classification Search .................. 361/36, 361/37
See application file for complete search history.

(56) References Cited

U.S. PATENT DOCUMENTS

| 2,196,411 | A | * | 4/1940 | Geise | .......................... 361/110 |
| 2,639,308 | A | | 5/1953 | Jean | |
| 4,623,265 | A | * | 11/1986 | Poyser | .......................... 374/152 |
| 5,946,171 | A | * | 8/1999 | Magnier | ....................... 361/37 |
| 6,456,095 | B1 | | 9/2002 | Sorita | |
| 6,804,092 | B1 | | 10/2004 | Magnier | |
| 7,317,598 | B2 | * | 1/2008 | Magnier | ....................... 361/37 |
| 2003/0164479 | A1 | * | 9/2003 | Goedde et al. | .............. 252/570 |
| 2005/0223782 | A1 | | 10/2005 | Dohi | |
| 2005/0253564 | A1 | * | 11/2005 | Choi | ........................... 323/207 |

FOREIGN PATENT DOCUMENTS

| EP | 0238475 | 9/1987 |
| GB | 693448 | 7/1953 |
| JP | 58218106 | 12/1983 |
| LV | 12029 | 5/1998 |
| WO | 97/12379 | 4/1997 |

* cited by examiner

*Primary Examiner*—Ronald W Leja
(74) *Attorney, Agent, or Firm*—Perkins Coie LLP

(57) ABSTRACT

The present invention relates to the system and method for protection, prevention and or detection of the explosion and or resulting fire in electrical transformers in advance, i.e before decomposition of combustible coolant fluid/dielectric oil.

10 Claims, 3 Drawing Sheets

METHOD AND DEVICE FOR PREVENTION AND PROTECTION OF ELECTRICAL TRANSFORMER AGAINST EXPLOSION AND FIRE

FIELD OF INVENTION

The present invention relates to the field of prevention, protection and/or detection of an explosion and/or resulting fire in electrical transformers. More particularly, the present invention relates to a system/device, which prevents and detects the possibility of an explosion and/or resulting fire in advance, namely before decomposition of combustible coolant fluid/dielectric oil.

BACKGROUND AND PRIOR ART DESCRIPTION

Electrical transformers exhibit losses both in the windings and in the core, for which reason the heat produced needs to be dissipated. High-power transformers are thus generally cooled using a fluid such as oil. The oils used are dielectric and can ignite above a temperature of the order of 140.degree. C. Since transformers are very expensive, particular attention must be paid to protecting them. An insulation fault first generates a strong electric arc, which prompts action by the electrical protection system, which trips the supply relay of the transformer (circuit breaker). The electric arc also causes consequent dissipation of energy, which generates release of gas from decomposition of the dielectric oil, in particular hydrogen and acetylene. After the gas has been released, the pressure inside the enclosure of the transformer increases very rapidly, whence an often very violent deflagration. Be deflagration results in extensive tearing of the mechanical connections in the enclosure (bolts, welds) of the transformer, which brings the said gases into contact with the oxygen in the surrounding air. Since acetylene can spontaneously ignite in the presence of oxygen, combustion immediately starts and causes a fire to spread to other on-site equipments, which may also contain large quantities of combustible products. Explosions arc due to short-circuits caused by overloads, voltage surges, progressive deterioration of the insulation, and insufficient oil level, the appearance of water or moisture or the failure of an insulating component. Fire protection systems for electrical transformers are known in the prior art, and combustion or fire detectors actuate these. However, these systems are implemented with a significant time lag, when the oil of the transformer is already burning. It is then being necessary to male to with limiting the combustion to the equipment in question, and to prevent the fire from spreading to the neighboring plant. In order to slow down the decomposition of the dielectric fluid due to an electric arc, silicone oils may be used instead of conventional mineral oils. However, explosion of the enclosure of the transformer due to the increase in the internal pressure is delayed only by an extremely short time, of the order of a few milliseconds. This length of time does make it possible to engage means, which can prevent the explosion.

The document WO-A-97/12379 discloses a method for prevention, protection and/or detection against explosion and/or resulting fire in an electrical transformer provided with an enclosure filled with combustible coolant fluid, by detecting a break in the electrical insulation of the transformer using a pressure sensor, depressurizing the coolant contained in the enclosure, using a valve, and cooling the hot parts of the coolant by injecting a pressurized inert gas into the bottom of the enclosure in order to stir the said coolant and prevent the oxygen from entering the enclosure of the transformer. This method is satisfactory and makes it possible to prevent the enclosure of the transformer from exploding up to some extent. However, the said method does not provide an indication in advance to take corrective measures. Also, by the time the corrective action takes place a significant amount of electrical insulation break down.

An electrical transformer exhibits inherent winding and core losses, generating heat which needs to be dissipated, by natural air cooling or natural oil cooling or forced air cooling or forced oil cooling. Larger electrical transformers are cooled generally using oil, which is a combustible coolant fluid. Larger electrical transformers have a device to detect and release the pressure developed due to expansion of the combustible coolant fluid inside the transformer tank and thereby prevent explosion.

Indian Patent Application IN189089 teaches a method and device for prevention, protection and/or detection of transformer against explosion and/or resulting fire. The patent provides a method of preventing, protecting and/or detecting an electrical transformer from deterioration by way of protecting, preventing and/or detecting said electrical transformer against explosion and/or resulting fire, said electrical transformer having an enclosure filled with a combustible coolant fluid said method comprising the steps of detecting a break in the electrical insulation of the transformer, using a pressure sensor means; partial draining of the coolant contained in the enclosure using a valve and; cooling the hot parts of the coolant by injecting a pressurized inert gas into the bottom of the enclosure in order to stir the coolant and flush the oxygen located in proximity. The said patent particularly refers to a pressure means for prevention, protection and/or detection of transformer against explosion and/or resulting fire, which is different from this invention. The patent fails in clearly mentioning about the nature of the pressure means.

U.S. Pat. No. 6,804,092 discloses a device for prevention, protection and detection against explosion and/or resulting fire of an electrical transformer comprising an enclosure filled with combustible coolant fluid, and a means for decompressing the enclosure of the transformer. The decompression means comprises a rupture element with integrated explosion detector provided with a retention part including first zones which have a reduced thickness in comparison with the rest of the retention part and are capable of tearing without fragmenting when the said element ruptures, and second zones which have reduced thickness in comparison with the rest of the retention part and are capable of folding without tearing when the said element ruptures. The said rupture element is capable of breaking when the pressure inside the enclosure exceeds a predetermined ceiling. The signal from an explosion detector integrated with the rupture disc triggers a cooling system and prevents oxygen from coming into contact with the explosive gases generated by the electric arc in contact with the oil.

U.S. Pat. No. 6,804,092 briefly elucidates regarding "Decompression/Means" wherein a rupture element tears with an increase in pressure in the transformer tank beyond a predetermined ceiling, which is not a foolproof system for detecting and preventing an explosion in an electrical transformer.

Both Prior Art systems discuss pressure developed and subsequent prevention measures through a rapture disc or "Pressure Means". In both the Prior Art systems namely IN189089 and U.S. Pat. No. 6,804,092 there are inherent disadvantages such as tearing occurring after significant delay from the occurrence the internal electric arc. Therefore it is likely that delay in detection of the pressure developed, explosion and or resulting fire in an electrical transformer take place. None of the prior art teaches the system or method which will detect or prevent occurring of tearing without delay.

Hence it is necessary to overcome the above drawbacks of both prior art and to invent a device and method for prevention protection and or detection of an electric transformer from explosion and/or resulting fire which takes preventive and protective measures with least delay.

OBJECTIVE OF THE INVENTION

The objective of the present invention is to provide a system, which eliminates the above-said drawbacks associated with prior system.

The primary objective of the present invention is to provide a system, which prevent and detects the possibility of explosion and/or resulting fire in advance, i.e before decomposition of combustible coolant fluid/dielectric oil.

Yet another objective of the present invention is to provide a foolproof system and method for the prevention, protection and/or detection of an electrical transformer against explosion and/or resulting fire with least delay.

Yet another objective of the present invention is to provide a system for preventing protecting and/or detecting explosion and/or resulting fire to a step up or step down transformer, which has an incoming voltage and outgoing voltage.

Yet another objective of the present invention is to provide a system, which is devoid of pressure sensors, temperature sensors or vapor sensors means.

Yet another objective of the present invention is to provide a system, which is economical and having minimal intricacies involved during operation.

SUMMARY OF THE INVENTION

Accordingly the present invention relates to a system and method for preventing, protecting and/or detecting explosion and/or resulting fire of electrical transformer in advance, said system comprising: one or more differential current sensing electrical relay for calculating the difference of input current and output current with the ceiling level and providing first input to the control unit, if ratio of input current to output current exceeding more than the predetermined limit one or more buchholz relay for sensing the excessive oil surge in the transformer and providing second input to the control unit, one or more circuit breakers for obtaining input signals from buchholz relay and/or other sensing means and proving third input to control unit, one or more control unit obtaining first, second and third input signals from the said electrical relay, buchholz relay and circuit breakers, generating control signal to energize lifting magnet for draining of the combustible coolant fluid through the drain valve and subsequently to inject inert gas from the bottom of the electrical transformer tank through a nitrogen release valve for stirring the coolant and bringing down oxygen contents for preventative measures against the explosion and/or resulting fire in the electrical transformer.

STATEMENT OF THE INVENTION

A system for preventing, protecting and/or detecting explosion and/or resulting fire of electrical transformer (30) in advance before decomposition of combustible coolant fluid/dielectric oil, said system comprising: one or more differential current sensing electrical relay (26) for calculating the difference of input current and output current with the ceiling level and thereby providing first input to the control unit (1), if ratio of input current to output current exceeding more than the predetermined limit; wherein said input current and output current are the currents from high voltage conductor (22) and low voltage conductor (23) of the electrical transformer (30) respectively;

one or more buchholz relay (18) for sensing the excessive oil surge in the transformer and thereby providing second input to the control unit (1), one or more circuit breakers for obtaining input signals from current sensing electrical relay (26) and buchholz relay (18) and thereby providing third input signal to control unit (1), one or more control unit (1) for receiving first, second and third input signals from the said differential current sensing electrical relay (26), buchholz relay (18) and circuit breakers (24, 28) respectively, and thereby generating control signal to energize lifting magnet (5) for draining of the combustible coolant fluid (11) through the drain valve (4) and subsequently injecting inert gas from the bottom of the electrical transformer tank (14) through a nitrogen release valve (6) for stirring the combustible coolant fluid (11) and bringing down temperature and oxygen contents for preventative measures against the explosion and/or resulting fire in the electrical transformer (30).

A method for protecting, preventing and/or detecting explosion and or resulting fire of electrical transformer (30) in advance (before generation of electric arc) by using the system as claimed in claim 1, wherein the said method comprising the steps of:

a) calculating difference of input current and output current across the electrical transformer (30) with the ceiling level by using one or more differential current sensing electrical relay (26) and thereby providing first input signal to the control unit (1), if ratio of input current to output current exceeding more than the predetermined limit; wherein said input current and output current are the currents from high voltage conductor (22) and low voltage conductor (23) of the electrical transformer (30) respectively;

b) sensing/detecting the excessive oil surge in the said transformer by using buchholz relay (18) and thereby providing second input signal to the control unit (1), c) providing third input signal to control unit (1) through circuit breakers (24, 28) while the said circuit breaker receiving input signals from buchholz relay (18) and current sensing electrical relay (26)

d) generating a control signal on the basis of first, second and third input signals from the said differential current sensing electrical relay (26), buchholz relay (18) and circuit breakers which are given to control unit (1), and thereby energizing a lifting magnet (5) for draining of the combustible coolant fluid (11) through the drain valve (4) and subsequently injecting inert gas from the bottom of the electrical transformer tank (14) through a nitrogen release valve (6) for stirring the coolant and bringing down oxygen contents for preventative measures against the explosion and/or resulting fire in the electrical transformer (30).

DETAIL DESCRIPTION OF THE FIGURES

Figure 1:
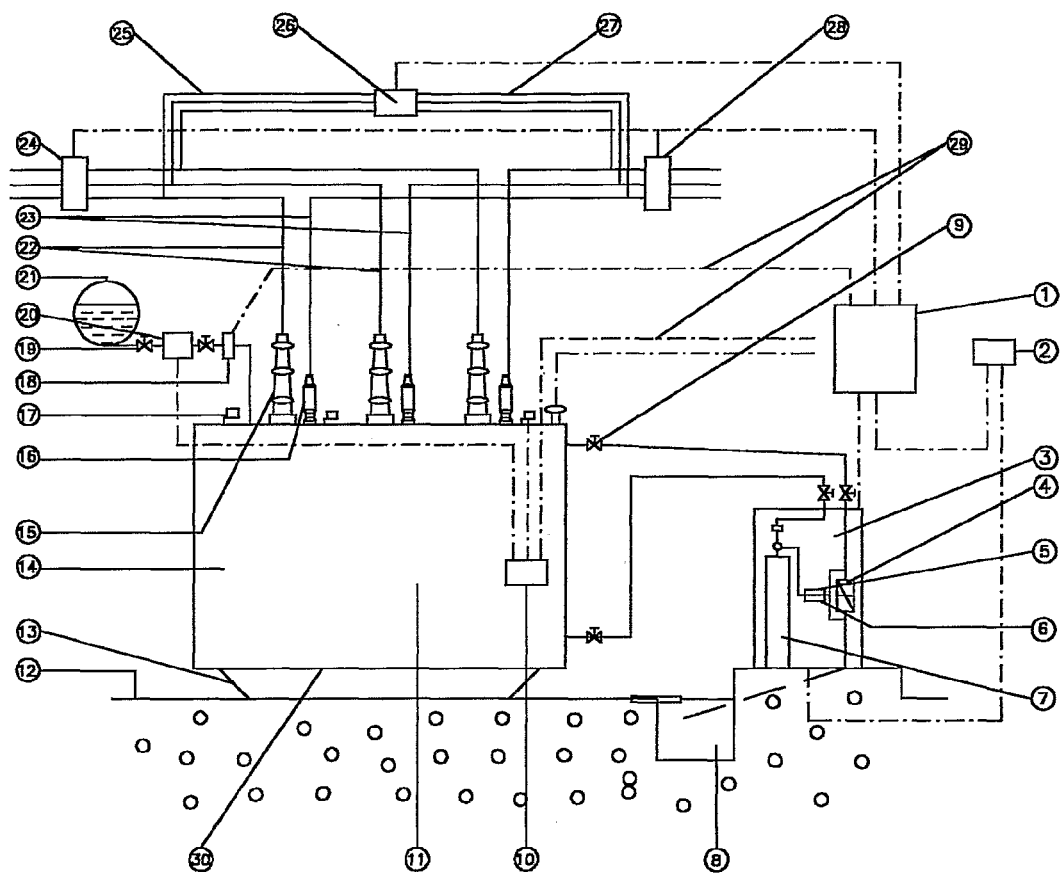
FIG. 1 is depicting the overall view of the system for prevention, protection and/or detection of the electrical transformer against explosion and/or resulting fire.
Figure 2:
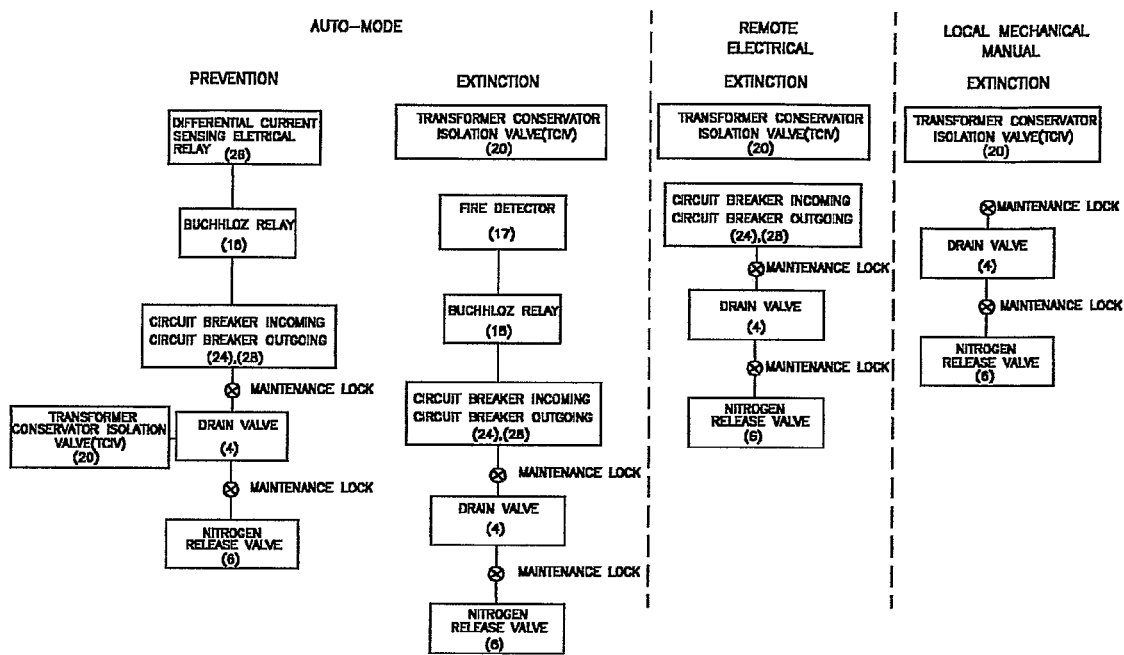
FIG. 2 is showing a schematic view representing logic of the method of operation of the device according to the invention.

FIG. 1 is the overall view of the device for prevention, protection and/or detection of the electrical transformer against explosion and/or resulting fire. Referring to FIG. 1: The electrical transformer (30) comprises of a electrical transformer tank (14) with electrical conductors carrying high or low tension voltage (22) connected to high or low voltage transformer bushing (15) another high or low voltage conductor (23) is connected to the other high or low voltage transformer bushing (16) as the case may be. The electrical transformer tank (14) is filled with combustible coolant fluid (11). The electrical transformer (30) is connected to an electrical transformer conservator (21) communicating with the electrical transformer tank (14) through a pipe or conduit (19). The pipe or conduit (19) provided with Electrical Transformer Conservator Isolation Valve (TCIV) (20) closes the pipe or conduit (19) as soon as rapid movement of combustible coolant fluid (11) from the electrical transformer conservator (21) to electrical transformer tank (14) is observed. The pipe or conduit (19) is also fitted with a buchholz relay (18) for sensing gas generation and/or a surge observed in the combustible coolant fluid (11) from the electrical transformer tank (14) towards the electrical transformer conservator (21). Electrical conductor carrying high or low voltage (22) and electrical conductor carrying high or low voltage (23) as the case may be through which current passes to the transformer for step up or step down of voltage and inverse for the current, differential current sensing electrical relay (26) for measuring the differential current between incoming High or Low Voltage electrical conductor (22) and outgoing High or Low Voltage electrical conductor (23) as the case may be. A predetermined difference limit is set in the current level of the differential current sensing electrical relay (26). When the predetermined difference in the current level is exceeded, the differential current sensing electrical relay (26) will trip the electrical transformer (30) through the circuit breaker(s). Buchholz relay also trips when there is sudden surge of the combustible coolant fluid (11). An output signal from the differential current sensing electrical relay (26) or the buchholz relay will trip the circuit breaker(s) on incoming (and if connected in parallel, outgoing connections with the high and low voltage transformer bushing (15) and (16)), simultaneously giving a signal to the control unit (1). This control unit (1) only generates a control signal, to the oil drain valve (4) if signals from the differential current sensing electrical relay (26) isolating the electrical transformer (30) and a signal from the buchholz relay isolating the electrical transformer (30) are both received The actuation of the combustible coolant fluid (11) drain valve (4) occurs upon receipt of a control signal generated by the control unit (1) which energize the lifting magnet (5) to commence draining, and subsequent injection of nitrogen gas from the bottom of the tank through nitrogen release valve (6) thereby ensuring stirring of oil and bringing down presence of oxygen in the space above the combustible coolant fluid (11) in the tank and thereby prevents and protects the combustible coolant fluid (11) within the electrical transformer tank (14). In case of bursting of any of the high or low voltage transformer bushing, nitrogen gas rises upwards through any rupture or opening caused by explosion and creates an envelope around the opening to reduce presence of oxygen. The nitrogen gas is stored in a pressurized nitrogen cylinder (7). The injection of the nitrogen gas is also governed by the control signal generated by the control unit (1). Further system as shown in FIG. 1 is provided with other constructional parts like fire detectors (17) to ensure prevention, protection and/or detection of electrical transformer against explosion and/or resulting fire.

Reference numerals used in figure are as follow:
1. control unit
2. supply device
3. FEC
4. Drain valve
5. Lifting magnet
6. Nitrogen release valve
7. Nitrogen cylinder
8. Oil pit
9. Transformer oil drain valve
10. Signal box
11. Combustible coolant fluid
12. Ground level
13. Wheels
14. electrical transformer tank
15. High voltage transformer bushing (or vice versa)
16. Low voltage transformer bushing (or vice versa)
17. Fire detectors
18. Buchholz relay
19. pipe or conduit
20. Electrical Transformer conservator isolation valve (TCIV)
21. Electrical Transformer conservator
22. Electrical conductor carrying high voltage (or vice versa)
23. Electrical conductor caring low voltage (or vice versa)
24. Circuit breaker incoming
25. Incoming line
26. Differential current sensing electrical relay
27. Outgoing line
28. Circuit breaker outgoing
29. Cables
30. Electrical transformer.

Figure 3:
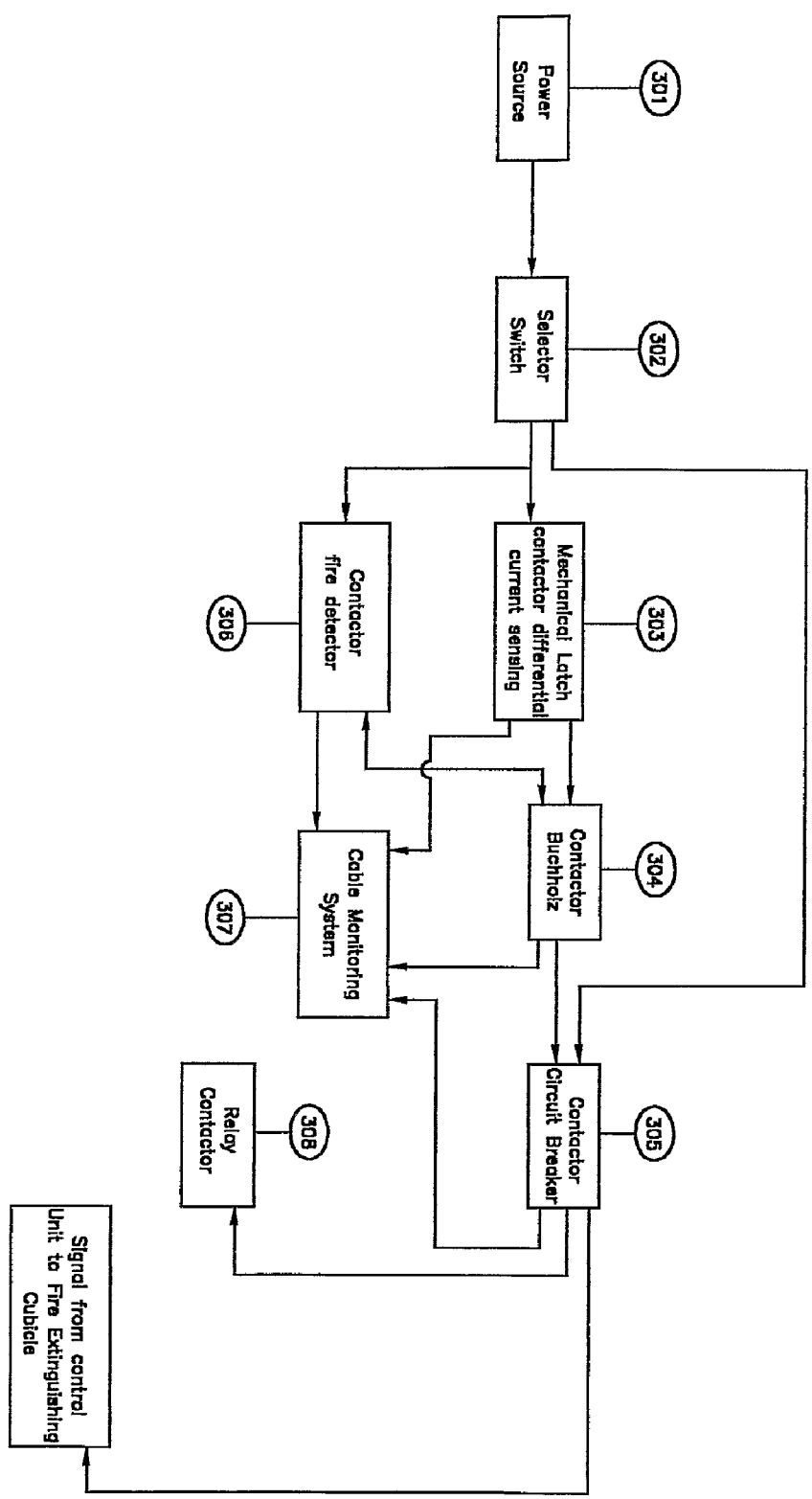
FIG. 3 is showing a schematic view representing lay out and logic of the control unit.

FIG. 3 is depicting control unit consists of power source (301), selector switch (302), for change-over, mechanical latch contactor (303) for differential current sensing relay signal, contactor (304) for buchholz relay signal, contactor (305) for circuit breaker(s) trip signal, contactor (306) for fire detector trip signal, cable monitoring system (307), relay/contactor (308) for tripping neighboring devices, equipment. When mechanical latch contactor (303), contactor (304) and contactor (305) gets energized, the control signal is given to the lifting magnet (5) to start the draining of combustible coolant fluid and subsequently to inject the nitrogen gas from the bottom of the electrical transformer tank. When contactors (306), (304) and (305) gets energized, the control signal is given to the lifting magnets(s) to start the draining of combustible coolant fluid and subsequently to inject the nitrogen gas from the bottom of the electrical transformer tank.

DETAIL DESCRIPTION OF THE INVENTION

Accordingly the present invention relates to system for prevention, protection and/or detection explosion and/or resulting fire of electrical transformer (30) in advance, said system comprising: one or more differential current sensing electrical relay (26) for calculating the difference of input current and output current with the ceiling level and providing first input to the control unit (1), if ratio of input current to output current exceeding more than the predetermined limit, one or more buchholz relay (18) for sensing the excessive oil surge in the transformer and providing second input signals to the control unit (1), one or more circuit breakers for obtaining input signals from buchholz relay (18) and/or other sensing means and providing third input to control unit (1), one or more control unit (1) obtaining first second and third input signals from the said differential current sensing electrical relay (26), buchholz relay (18) and circuit breakers (24, 28), generating control signal to energize lifting magnet (5) for draining of the combustible coolant fluid (11) through the drain valve (4) and subsequently to inject inert gas from the bottom of the electrical transformer tank (14) through a nitrogen release valve (6) for stirring the combustible coolant fluid (11) and bringing down temperature and oxygen contents for preventative measures against the explosion and or resulting fire in the electrical transformer (30).

In one embodiment of the present invention relates to a system wherein the input current and output current of the differential current sensing electrical relay (26) are the current from high voltage conductor (22) and low voltage conductor (23) respectively.

In one another embodiment of the present invention relates to a system wherein the said electrical transformer (30) having an electrical transformer tank (14) filled with a combustible coolant fluid (11).

Yet another embodiment of the present invention relates to a system wherein the nitrogen release valve (6) injecting nitrogen gas for stirring the coolant and bringing down oxygen content.

Still another embodiment of the present invention relates to a system wherein the differential current sensing electrical relay (26) provide first input signal to control unit (1), if ratio of input current and output current exceeds more than 1:40.

Yet another embodiment of the present invention relates to a system wherein generating the control signal form control unit (1) and draining the combustible coolant fluid (11) through the drain valve (4) and subsequently injecting of inert gas from the bottom of the electrical transformer tank (14) is carried out within a time period in the range of 50 to 700 mili second.

Yet one another embodiment of the present invention relates to a system wherein the electrical transformer (30) is connected with electric transformer conservator isolation valve (TCIV) (20) and electric transformer conservator (21) through a conduit or pipe (19) for carrying out isolation of electrical transformer (30) when rapid movement of combustible coolant fluid (11) from electrical transformer conservator (21) to electric transformer tank (14).

A further embodiment of the present invention relates to a method for prevention, protection and/or detection explosion and/or resulting of electrical transformer (30) in advance by using the system, wherein the said method comprising the steps of: a) calculating difference of input current and output current across the electrical transformer (30) with the ceiling level by using one or more differential current sensing electrical relay (26) and providing first input signal to the control unit (1), if ratio of input current to output current exceeding more than the predetermined limit, b) sensing/detecting the excessive oil urge in the said transformer by using buchholz relay (18) and providing second input signal to the control unit (1), c) providing third input signal to control unit (1) through circuit breakers (24, 28) while the said circuit breaker receiving input signals from buchholz relay (18) and/or the sensing means, d) generating a control signal while obtaining first, second and third input signals from the said differential current sensing electrical relay (26) buchholz relay (18) and circuit breakers at control unit (1), energizing a lifting magnet (5) for draining of the combustible coolant fluid (11) through the drain valve (4) and subsequently to inject inert gas from the bottom of the electrical transformer tank (14) through a nitrogen release valve (6) for stirring the coolant and bringing down oxygen contents for preventative measures against the explosion and/or resulting fire in the electrical transformer (30).

Yet another embodiment of the present invention wherein in step (a), the input current and output current of the differential current sensing electrical relay (26) are the current from high voltage conductor (22) and low voltage conductor (23) respectively.

Yet another embodiment of the present invention wherein in step (a), the differential current sensing electrical relay (26) provide first input signal to control unit (1), if ratio of input current and output current exceeds more than 1:40.

Still another embodiment of the present invention wherein generating the control signal form control unit (1) and draining the combustible coolant fluid (11) through the drain valve (4) and subsequently injecting of inert gas from the bottom of the electrical transformer tank (14) is carried out within a time period in the range of 50 to 700 mili second.

Still one another embodiment of the present invention wherein in step (d) the nitrogen release valve (6) injecting nitrogen gas for stirring the coolant and bringing down oxygen contents.

Yet another embodiment of the present invention, wherein in step (d) the electrical transformer (30) is isolated by using electrical transformer conservator isolation valve (TCIV) (20), when rapid movement of combustible coolant fluid (11) from electrical transformer conservator (21) to electrical transformer tank (14) detected.

Experiments have shown that the imbalance of incoming current and outgoing current in an electrical transformer (30) is measured by a differential current sensing electrical relay which detects the difference between incoming and outgoing current. As soon as a predetermined limit of imbalance in incoming and outgoing current or vice versa is exceeded, the differential current sensing electrical relay will trip giving a signal to the incoming and outgoing circuit breakers connected to the electrical transformer (30) to trip and the electrical transformer will be isolated from the incoming source (and also outgoing source, in case the electrical transformer outgoing is connected to another electrical transformer outgoing in parallel). Also, if there is a surge in the combustible coolant fluid due to a sudden turbulence build up, it is detected by the Buchholz relay. The buchholz relay will also give a signal to the incoming and outgoing circuit breakers of the electrical transformer to trip and the electrical transformer will be isolated. The method for prevention, protection and/or detection of an electrical transformer against explosion and/or resulting fire, where the electrical transformer has an enclosure filled with a combustible coolant fluid, comprises of the following steps: Detecting an abnormal situation by sensing the difference between the incoming and outgoing transformer current using a differential current sensing electrical relay; ii. Detecting an excessive oil surge using a buchholz relay; iii. Communicating output signals both of the differential current sensing electrical relay and buchholz relay to the control unit for generating a control signal; iv. Draining of the combustible coolant fluid using a valve which is activated by a control signal generated by the control unit; v. Injecting nitrogen gas from the bottom of the transformer tank for stirring the coolant thereby lowering the temperature of the combustible coolant fluid and also bringing down the oxygen content, wherein the said differential currant sensing electrical relay detects the difference between the incoming and outgoing current with a predetermined limit and as soon as the predetermined limit is exceeded, the differential current sensing electrical relay trips the incoming and outgoing circuit breakers of the electrical transformer and isolate it. Further, the present invention provides for a method and device for prevention, protection and detection of an electrical transformer against explosion and/or resulting fire, the said device comprising of:

i. Differential current sensing electrical relay for detecting the difference between input current and output current with the predetermined level;

ii. Buchholz relay for detecting an excessive oil surge iii. Circuit breakers for obtaining input signals from buchholz relay and/or other sensing means;

iv. The control unit to generate a control signal to energize a lifting magnet for draining of the combustible coolant fluid and subsequently injects nitrogen gas from the bottom of the electrical transformer through a valve so as to stir the combustible coolant fluid and reduce presence of oxygen;

v. When output signals from the differential current sensing electrical relay, the buchholz relay and from the circuit breaker(s) are communicated to the control unit, then the control unit generates a control signal which activates draining of the combustible coolant fluid and nitrogen gas injection for commencing preventative, protective and/or detective measures against likely explosion and/or resulting fire in an electrical transformer.

Further, according to present invention nitrogen gas is stored in a pressurized cylinder and injection of the same is carried out at a predetermined rate is controlled by a valve, which is actuated by the control signal generated by the control unlit.

ADVANTAGE OF THE INVENTION

1. The present invention is capable to prevent and detects the possibility of explosion and/or resulting fire in advance, i.e before decomposition of combustible coolant fluid/dielectric oil.
2. Another advantage of the present invention relates to provide a foolproof system and method for the prevention, protection and/or detection of an electrical transformer against explosion and/or resulting fire with least delay.
3. Yet another advantage of the present invention is to a step up or step down transformer, which has an incoming voltage and outgoing voltage.
4. Yet another advantage of the present invention is that the system is devoid of pressure sensors, temperature sensors or vapor sensors.

I claim:

1. A system to prevent fire and/or explosion in an electrical transformer (30) or to protect the transformer (30) from resulting fire and/or explosion in advance before decomposition of combustible coolant fluid (11) or dielectric oil, said system comprising:

one or more differential current sensing electrical relays (26) for calculating the difference of an input current and an output current with a predetermined limit and thereby providing first input to one or more control units (1), if a ratio of input current to output current exceeds more than the predetermined limit; wherein said input current and output current are the currents from a high voltage conductor (22) and a low voltage conductor (23) of the electrical transformer (30) respectively;

one or more Buchholz relays (18) for sensing excessive oil surge in the transformer (30) and thereby providing second input to the one or more control units (1), one or more circuit breakers (24, 28) for obtaining input signals from the one or more differential current sensing electrical relay (26) and Buchholz relays (18) and thereby providing a third input signal to the one or more control units (1), and wherein the one or more control units (1) for receiving first, second and third input signals from the said one or more differential current sensing electrical relays (26), one or more Buchholz relays (18) and one or more circuit breakers (24, 28) respectively, and thereby generating a control signal to energize a lifting magnet (5) for draining of the combustible coolant fluid (11) through a drain valve (4) and subsequently injecting inert gas from the bottom of an electrical transformer tank (14) through a nitrogen release valve (6) for stirring the combustible coolant fluid (11) and bringing down temperature and oxygen content for preventative and/or protective measures against the explosion and/or resulting fire in the electrical transformer (30).

2. The system as claimed in claim 1, wherein the said electrical transformer (30) has an electrical transformer tank filled with a combustible coolant fluid (11).

3. The system as claimed in claim 1, wherein the differential current sensing electrical relay (26) provides first input signal to the one or more control units (1), if a ratio of input current and output current exceeds more than 1:40.

4. The system as claimed in claim 1, wherein generating the control signal from the one or more control units (1) and draining the combustible coolant fluid (11) through the drain valve (4) and subsequently injecting of inert gas from the bottom of the electrical transformer tank (14) is carried out within a time period in the range of 50 to 700 milliseconds.

5. The system as claimed in claim 1, wherein the electrical transformer (30) is connected with electric transformer conservator isolation valve (TCIV) (20) and electrical transformer conservator (21) through a pipe or conduit (19) for carrying out isolation of the electrical transformer (30) when rapid movement of combustible coolant fluid (11) from electrical transformer conservator (21) to electric transformer tank (14) is detected.

6. A method for preventing fire and/or explosion in the electrical transformer (30) or protecting the transformer from resulting fire and/or explosion in advance (before generation of an electric arc) by using the system as claimed in claim 1, the said method comprising the steps of:

a) calculating the difference of input current and output current across the electrical transformer (30) with the predetermined limit by using one or more differential current sensing electrical relays (26) and thereby providing a first input signal to the one or more control units (1), if a ratio of input current to output current exceeds more than the predetermined limit; wherein said input current and output current are the currents from the high voltage conductor (22) and the low voltage conductor (23) of the electrical transformer (30) respectively;

b) sensing/detecting the excessive oil surge in said transformer (30) by using the one or more Buchholz relays (18) and thereby providing the second input signal to the one or more control units (1), c) providing the third input signal to the control unit (1) through the circuit breakers (24, 28) while the said one or more circuit breakers (24, 28) receives input signals from the one or more Buchholz relays (18) and the current sensing electrical relay (26), d) generating a control signal on the basis of first, second and third input signals from the said one or more differential current sensing electrical relays (26), one or more Buchholz relays (18) and circuit breakers (24, 28) which are given to the one or more control units (1), and thereby energizing the lifting magnet (5) for draining of the combustible coolant fluid (11) through the drain valve (4) and subsequently injecting inert gas from the bottom of the electrical transformer tank (14) through a nitrogen release valve (6) for stirring the coolant (11) and bringing down oxygen content for preventative measures against the explosion and/or resulting fire in the electrical transformer (30).

7. The method as claimed in claim 6, wherein in step (a), the differential current sensing electrical relay (26) provides the first input signal to the one or more control units (1), if a ratio of input current and output current exceeds more than 1:40.

8. The method as claimed in claim 6, wherein in step (d) generating the control signal from the one or more control units (1) and draining the combustible coolant fluid (11) through the drain valve (4) and subsequently injecting of inert gas from the bottom of the electrical transformer tank (14) is carried out within a time period in the range of 50 to 700 milliseconds.

9. The method as claimed in claim 6, wherein in step (d) the electrical transformer (30) is isolated by using electrical transformer conservator isolation valve (TCIV) (20), when rapid movement of combustible coolant fluid (11) from an electrical transformer conservator (21) to electrical transformer tank (14) is detected.

10. An electrical transformer (30) comprising a system as claimed in claim 1 to prevent fire and/or explosion in an electrical transformer (30) or to protect the transformer (30) from resulting fire and/or explosion.

* * * * *